(12) United States Patent
Lee et al.

(10) Patent No.: US 10,804,002 B2
(45) Date of Patent: Oct. 13, 2020

(54) RADIATION AND HEAT RESISTANT CABLES

(71) Applicant: GENERAL CABLE TECHNOLOGIES CORPORATION, Highland Heights, KY (US)

(72) Inventors: Elliot Byunghwa Lee, Carmel, IN (US); Srinivas Siripurapu, Carmel, IN (US); Koksal Tonyali, Bolton, CT (US)

(73) Assignee: GENERAL CABLE TECHNOLOGIES CORPORATION, Highland Heights, KY (US)

( * ) Notice: Subject to any disclaimer, the term of this patent is extended or adjusted under 35 U.S.C. 154(b) by 189 days.

(21) Appl. No.: 14/825,503

(22) Filed: Aug. 13, 2015

(65) Prior Publication Data

US 2016/0049221 A1 Feb. 18, 2016

Related U.S. Application Data

(60) Provisional application No. 62/036,829, filed on Aug. 13, 2014.

(51) Int. Cl.
*H01B 9/00* (2006.01)
*H01B 1/02* (2006.01)
(Continued)

(52) U.S. Cl.
CPC ............. *H01B 1/02* (2013.01); *H01B 1/026* (2013.01); *H01B 3/441* (2013.01); *H01B 3/446* (2013.01);
(Continued)

(58) Field of Classification Search
CPC .................. H01B 3/30; H01B 7/295
(Continued)

(56) References Cited

U.S. PATENT DOCUMENTS 3,651,244 A * 3/1972 Silver .................... H01B 9/022
156/54
3,823,255 A * 7/1974 La Gase ................ H01B 7/295
174/113 R (Continued)

FOREIGN PATENT DOCUMENTS

CN 1811999 * 8/2006 ............ H01B 7/295
JP S56-19804 A 2/1981
(Continued)

OTHER PUBLICATIONS

Copenheaver, Blaine; International Search Report and Written Opinion of the International Searching Authority, issued in International Application No. PCT/US2015/045005; dated Oct. 30, 2015; 11 pages.
(Continued)

*Primary Examiner* — William H. Mayo, III
(74) *Attorney, Agent, or Firm* — Ulmer & Berne LLP

(57) ABSTRACT

A cable intended for use in a nuclear environment includes one or more conductors, a longitudinally applied corrugated shield surrounding the one or more conductors, and a cross-linked polyolefin jacket layer surrounding the longitudinally applied corrugated shield. The cable conducts about 5,000 volts to about 68,000 volts in use and is radiation resistant and heat resistant. The cable comprises a life span of about 40 years or more when measured in accordance with IEEE 323. Methods for making a cable and a nuclear reactor utilizing such a cable are also provided.

19 Claims, 3 Drawing Sheets

(51) Int. Cl.
*H01B 3/44* (2006.01)
*H01B 7/29* (2006.01)
*H01B 7/295* (2006.01)
*H01B 7/28* (2006.01)
*H01B 9/02* (2006.01)
*H01B 3/28* (2006.01)

(52) U.S. Cl.
CPC ........... *H01B 7/2806* (2013.01); *H01B 7/292* (2013.01); *H01B 7/295* (2013.01); *H01B 9/02* (2013.01); *H01B 3/28* (2013.01)

(58) Field of Classification Search
USPC ........... 174/102 R, 102 SC, 108, 109, 113 R, 174/120 R, 120 SR, 120 AR
See application file for complete search history.

(56) References Cited

U.S. PATENT DOCUMENTS

| | | | | |
|---|---|---|---|---|
| 3,943,271 | A | * | 3/1976 | Bander ................ H01B 7/2813 174/102 D |
| 4,051,324 | A | | 9/1977 | Anderson et al. |
| 4,079,191 | A | | 3/1978 | Robertson et al. |
| 4,096,346 | A | | 6/1978 | Stine et al. |
| 4,130,450 | A | * | 12/1978 | Bander ................... H01B 7/282 156/47 |
| 4,145,567 | A | * | 3/1979 | Bander ................ H01B 7/2825 156/56 |
| RE30,228 | E | * | 3/1980 | Silver .................... H01B 9/022 174/36 |
| 4,452,279 | A | | 6/1984 | Atwell |
| 4,533,789 | A | * | 8/1985 | Katz ........................ H01B 7/18 174/102 R |
| 5,087,408 | A | | 2/1992 | Tominaga et al. |
| 5,096,659 | A | | 3/1992 | Hidaka et al. |
| 5,300,337 | A | | 4/1994 | Andrieu et al. |
| 5,304,739 | A | | 4/1994 | Klug et al. |
| 5,438,164 | A | | 8/1995 | Green |
| 6,127,632 | A | | 10/2000 | Oswald et al. |
| 6,340,510 | B2 | | 1/2002 | Hess et al. |
| 6,720,498 | B2 | | 4/2004 | Grögl et al. |
| 7,395,680 | B2 | | 7/2008 | Baer et al. |
| 7,757,517 | B2 | | 7/2010 | Malloy |
| 8,502,069 | B2 | | 8/2013 | Holland et al. |
| 2006/0137894 | A1 | * | 6/2006 | Cusson .................... H01B 7/20 174/105 R |
| 2007/0092053 | A1 | | 4/2007 | Sato |
| 2009/0323884 | A1 | | 12/2009 | Sato et al. |
| 2010/0108171 | A1 | | 5/2010 | Relats Manent et al. |
| 2010/0132973 | A1 | * | 6/2010 | Fitz .......................... H01B 9/02 174/102 R |
| 2011/0127065 | A1 | | 6/2011 | Park |
| 2011/0187116 | A1 | | 8/2011 | Dorfman et al. |
| 2011/0209601 | A1 | | 9/2011 | Relats Casas et al. |
| 2013/0180755 | A1 | * | 7/2013 | Park ......................... H01B 7/17 174/120 SR |
| 2013/0299211 | A1 | | 11/2013 | Pope |
| 2014/0151084 | A1 | * | 6/2014 | Spalding ................. H01B 3/30 174/120 SR |

FOREIGN PATENT DOCUMENTS

| | | |
|---|---|---|
| JP | S58-113218 U | 8/1983 |
| JP | 2000-90748 A | 3/2000 |
| JP | 2010-170714 A | 8/2010 |
| WO | 95/04358 A1 | 2/1995 |

OTHER PUBLICATIONS

General Cable; Ultrol Nuclear Cables Catalog—Ultrol Class 1E & Non-Safety Cables; Feb. 2011; 64 pages.
The Okonite Company; Product Data Section 4: Sheet 22, Okonite®-FMR-LCS® Okolon® TS-CPE; Sep. 21, 2010; 2 pages.
Database WPI, Week 200723; Thomson Scientific, London, GB; AN 2007-222909, XP-002778455, and CN 1 811 999 (Ding D) Aug. 2, 2006, abstract; 1 page.
Marsitzky, Dirk; Extended European Search Report, including supplementary European search report and the European search opinion, issued in European Patent Application No. 15832427.7; dated Mar. 12, 2018; 6 pages.
Wada, Zaita; Notice of Reasons for Rejection issued in Japanese Patent Application No. 2017-507740; dated Sep. 24, 2019; 8 pages, including English translation.
Wada, Zaita; Decision of Rejection issued in Japanese Patent Application No. 2017-507740; dated Jan. 20, 2020; 6 pages, including English translation.
Alzayed, Mariam; First Examination Report issued in GC Patent Application No. GC 2015-29884; dated Sep. 4, 2018; 5 pages.
Albaker, Fahad M.; Second Examination Report issued in GC Patent Application No. GC 2015-29884; dated Mar. 24, 2019; 3 pages.
Kuriyama, Isamu et al.; Development of cables for nuclear power generating stations; Hitachi critical essay, Japan, Hitachi Cable Co., Ltd.; Mar. 1976, vol. 58, No. 3; pp. 79-84 and English abstract.
Kuriyama, Isamu et al.; Current development of insulating cables for nuclear power generating stations; Nippon Genshiryoku Gakkai-Shi (Journal of the Atomic Energy Society of Japan); 1978, vol. 20, No. 1; pp. 21-29 and English abstract.
Wada, Zaita; Pre-Appeal Report issued in Japanese Patent Application No. 2017-507740; Jun. 22, 2020; 4 pages with English translation.

* cited by examiner

RADIATION AND HEAT RESISTANT CABLES

REFERENCE TO RELATED APPLICATIONS

The present application claims the priority of U.S. provisional application Ser. No. 62/036,829, entitled RADIATION AND HEAT RESISTANT CABLES, filed Aug. 13, 2014, and hereby incorporates the same application herein by reference in its entirety.

TECHNICAL FIELD

The present disclosure generally relates to the construction of cables resistant to the damaging conditions of a nuclear environment for extended periods of time.

BACKGROUND

Cables utilized in nuclear environments such as inside of a nuclear reactor's containment vessel are continually subject to damaging conditions involving heat, radiation, pressure, and vibration. Cables in such damaging environments are critical to the safe operation of the reactor. Consequently, such cables must have exceptional durability and resistance to heat, radiation, vibration, humidity, and pressure. These requirements are reflected in IEEE 323 cable standards which require cables to last 40 years, or more, before suffering functional or structural degradation. Additionally, these standards require that cables must remain both structurally and functionally intact in the event of a nuclear incident such as a loss of cooling. Existing cables intended for use in nuclear environments have not demonstrated satisfactory performance to the requirements necessary for a new generation of reactors and have conversely shown, among other detriments, susceptibility to oxidation and radiation, structural failures, and limited lifespans of about 40 years. There is, therefore, a need for an improved cable that can operate for about 40 years or more in a nuclear environment.

SUMMARY

In accordance with one embodiment, a cable for nuclear environments includes one or more conductors, a longitudinally applied corrugated shield surrounding the one or more conductors, and a cross-linked polyolefin jacket layer surrounding the longitudinally applied corrugated shield. The cable conducts about 5,000 volts to about 68,000 volts in use and is radiation resistant and heat resistant. The cable has a life span of about 40 years or more when measured in accordance with IEEE 323.

In accordance with another embodiment, a cable for a nuclear environment includes one or more conductors, an insulation layer surrounding the one or more conductors, a longitudinally applied corrugated shield surrounding the insulation layer, and a cross-linked polyolefin jacket layer surrounding the longitudinally applied corrugated shield. The cable conducts about 5,000 volts to about 68,000 volts in use. The cable is substantially free of cracks after being artificially aged with heat and about 100 MRads of radiation to an age of about 40 years or more.

In accordance with another embodiment, a cable for nuclear environments includes one or more conductors, a longitudinally applied corrugated shield surrounding the one or more conductors, and a cross-linked polyolefin jacket layer surrounding the longitudinally applied corrugated shield. The cable conducts about 5,000 volts to about 68,000 volts in use, and maintains structural and functional integrity after artificially aging the cable at about 180° C. for about 24 hours and with about 100 MRad of radiation to an age of about 40 years or more.

DETAILED DESCRIPTION

Figure 1:
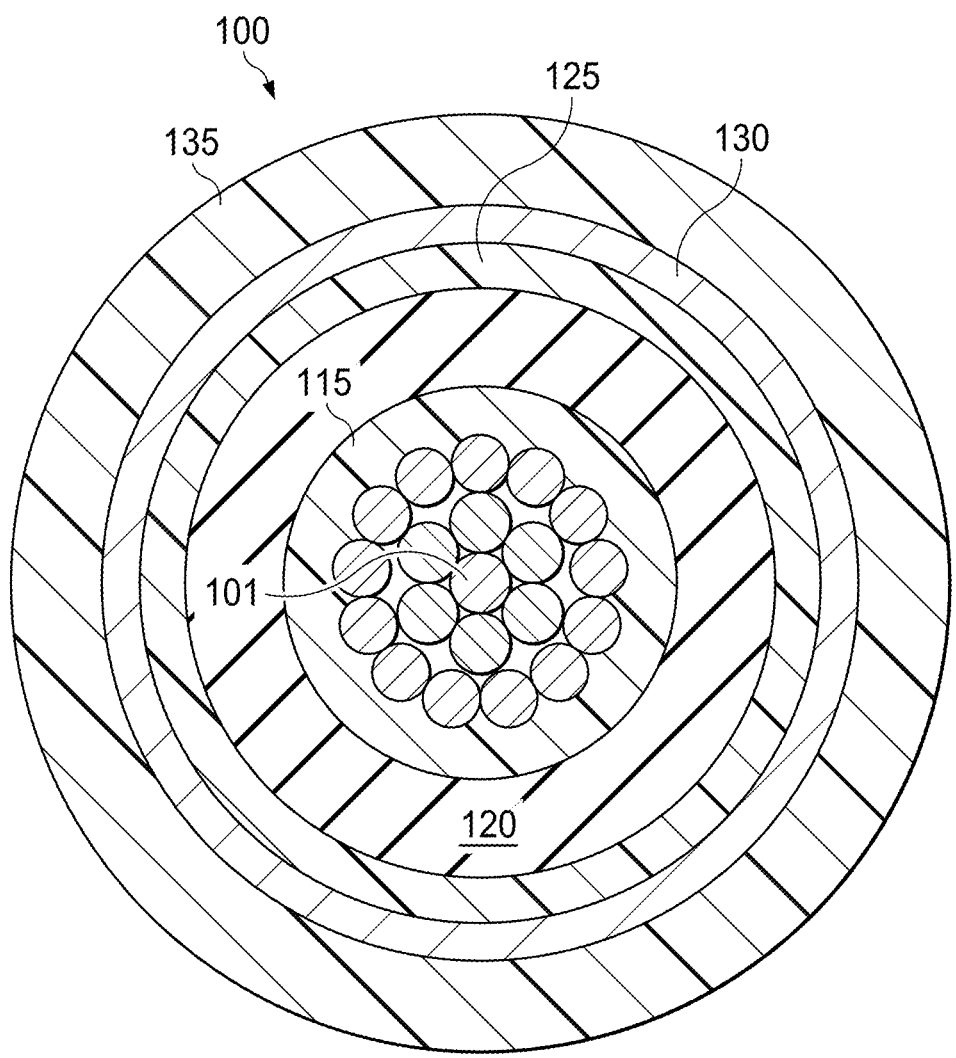
FIG. 1 depicts a cross-sectional view of a medium-voltage cable for use in nuclear environments according to certain embodiments.

Cables, such as power cables, intended for use in a nuclear environment must satisfy a variety of strict design and operational requirements to maintain electrical functionality and structural integrity. For example, a cable suitable for use in a nuclear reactor can be resistant to one or more of heat, radiation, moisture, vibration, or pressure and have a life span of about 40 years or more, and in certain embodiments, about 60 years or more. A cable suitable for use in a nuclear environment can generally include one or more conductors in a central core, a layer of insulation surrounding the one or more conductors, a longitudinally applied shield surrounding the insulation, and a jacket layer surrounding the longitudinally applied shield.

The one or more conductors can be formed from any suitable conductive metal such as for example copper, a copper alloy, aluminum, an aluminum alloy, or aluminum-zirconium alloy. As known in the art, the quantity and size of suitable conductors can vary depending upon such requirements as power transmission and attenuation requirements. For example, in some embodiments, multiple conductors can be concentrically twisted to form a 1/0 American Wire Gauge "AWG" conductor. As can be appreciated, the conductors can, in certain embodiments, also be protected against corrosion through a suitable coating process. For example, in certain embodiments, the conductors can be protected through a tinning process in accordance with ASTM B33 and ASTM B8 to apply a coating of tin around the conductors. As can be further appreciated, such a process can be performed on each of the individual conductor strands or such a process can be performed only on select conductors such as the outer-most conductors.

As will be appreciated, the one or more conductors can be arranged in any suitable arrangement that can conduct the required power requirements while providing support for the cable. According to certain embodiments, the conductor of a 1/0 AWG 15 kV cable can operate about 15° C. to about 30° C. warmer than the surface temperature of the cable.

The insulation layer can be formed from any suitable insulation that provides desired insulation properties, dielectric properties, as well as adequate resistance to various environmental conditions such as heat, radiation, and vibration. For example, in certain embodiments, the insulation layer can be formed from one, or more, polymers such as ethylene propylene rubber or cross-linked polyethylene ("XLPE"). The insulation layer can vary in size depending on the voltage rating of the cable and can be, for example, about 0.10 inches to about 0.25 inches thick for a 1/0 AWG cable that has a voltage rating of about 15 kV. One skilled in the art will appreciate that other suitable materials and constructions could also be used to form the insulation layer.

According to certain embodiments, a cable for use in nuclear environments can include a longitudinally applied shield. The use of a longitudinally applied shield can improve the structural and functional integrity of a cable that is subject to the stresses due to high heat and radiation of a nuclear environment when compared to an identical cable without such a shield or with an alternative shield design. For example, the intense heat of a nuclear reactor can cause a cable with a helically applied tape shield to prematurely split, or burst, exposing the interior portion of the cable to damage. Such damage can impair the structure and function of the cable and can be particularly dangerous in the event of a nuclear incident by creating additional debris. In addition, the sharp edges of the split tape can further damage the jacket or surrounding environment. In contrast, a longitudinally applied shield can be stable in the radiation and heat of a nuclear environment and can resist degradation and tape splitting even over the expected 40 or more year life span of the cable. An additional benefit is that a longitudinally applied shield can include a continuous surface area that prevents oxidation from attenuating the cable.

The longitudinally applied shield can be constructed from any suitable material such as for example, non-magnetic (or diamagnetic) materials such as, for example, copper, or a copper alloy. The overlap of a longitudinally applied shield can vary depending on the gauge of the conductor. The overlap is generally defined by the amount one edge of the longitudinally applied shield passes over the opposite edge as the shield is wrapped about the conductors and insulation layer of the cable. For example, a suitable overlap for a 1/0 AWG cable can be about 0.15 inches or greater in certain embodiments, about 0.20 inches or greater in certain embodiments, or about 0.25 inches or greater in certain embodiments. As can be appreciated, the longitudinally applied shield can, in certain embodiments, be further protected against oxidation and corrosion through a suitable coating process. In certain embodiments, the longitudinally applied shield can, for example, be protected through a tinning process that applies a thin layer of tin as an outer layer to the shield to prevent corrosion and oxidation damage to the shield. This can help avoid attenuation and damage to the cable.

In certain embodiments, the longitudinally applied shield can be corrugated to form a longitudinally applied corrugated shield. Such corrugation can provide for further improved properties including increased flexibility and mechanical strength over a non-corrugated longitudinally applied shield.

According to certain embodiments, a suitable jacket layer can be included to surround the longitudinally applied shield. The jacket layer can assist in resisting the high heat, radiation, and pressure found in a nuclear environment. In certain embodiments, a jacket layer can be formed from a cross-linked polyolefin including, for example, ethylene-containing polymers such as polyethylene (including low-density polyethylene (LDPE), high-density, high molecular weight polyethylene (HDPE), ultra-high molecular weight polyethylene (UHDPE), linear-low-density polyethylene (LLDPE), very-low density polyethylene, etc.), ethylene vinyl acetate, as well as polypropylene, maleated polypropylene, polybutylene, polyhexalene, polyoctene, and copolymers, mixtures, or blends thereof.

Cross-linking of the polyolefin jacket layer can occur through a radiation cross-linking process or through a moisture-cure cross-linking process. Suitable examples of such cross-linking processes include electron beam cross-linking, silane cross-linking, and peroxide curing. Suitable silane cure processes can include Sioplas, Monosil, Visico™, and Ambicat.

As can be appreciated, a cable suitable for use in a nuclear environment can further include other components according to certain embodiments, including, for example, one, or more, of a conductor shield and an insulation shield. Such conductor and insulation shields can independently be semi-conducting polymer layers formed from a cross-linked polymer. Semi-conductive polymers can be formed through the incorporation of fillers such as, carbon black, graphite, or metallic particles into the polymer matrix. Cross-linking of the semi-conductive polymer can occur through any suitable method including, for example, moisture, chemical, heat, UV, and e-beam curing methods. Cross-linking agents can include, but are not limited to, cross-linking agents that are reactive to hydroxyls, acids, epoxides, amines, cyanate containing monomers, or oligomers or polymers which have urethane, fluorine, silane, fluoro silane, fluoro silicones, silsesquioxanes, polytetrafluoroethylene ("PTFE"), epoxy, phenolic, ether, silicone, or acrylic groups in back bones or grafted, either alone or in combination with other functional groups, in liquid, semi-solid, or powdered forms. Suitable chemical cross-linking agents (e.g., reactive agents) can include a monomeric or oligomeric polymeric resin that, when mixed with a cross-linkable fluoro copolymer, can promote curing of the composition. Specific examples of suitable cross-linking agents can include acrylates, fluoro silanes, fluoro silicones, methacrylic esters, silanes, metal catalysts, triallyl isocyanurate ("TAIC"), peroxides, or combinations thereof. In certain illustrative embodiments, the fluoro copolymer can have, for example, hydroxyl groups that can be cross-linked with a polyisocyanate cross-linking agent such as hexamethylene-6,6-diisocyanate ("HDI"). Such HDI agents can be either aromatic or aliphatic based. In certain embodiments, a catalyst can additionally be included to accelerate the cross-linking reaction.

A cable suitable for use in a nuclear environment which includes a conductor shield and a tape shield is depicted in FIG. 1. As shown in FIG. 1, a cable 100 includes one or more conductors 101, a conductor shield 115, an insulation layer 120, an insulation shield 125, a longitudinally applied shield 130, and a jacket layer 135. According to certain embodiments, a method of manufacturing such a cable 100 can include the steps of providing the one or more conductors 101, applying the longitudinal shield 130 along the one or more conductors 101, corrugating the longitudinal shield 130 to form a longitudinally applied corrugated shield, applying a jacket layer 135 around the longitudinally applied corrugated shield, and then curing the jacket layer 135.

In certain embodiments, a cable suitable for use in a nuclear environment can be a medium voltage cable and can conduct about 5,000 volts to about 68,000 volts. As will be appreciated, the gauge of the cable can vary depending on the voltage and current. For example, a 15,000 volt cable suitable for use in a nuclear environment can be a 1/0 AWG cable.

Cables suitable for use in a nuclear reactor are required to have a life span of about 40 years or more according to reactor manufacturing requirements. A cable's lifetime can be estimated in a relatively short amount of time through the process of artificial aging using, for example, IEEE 323 standards. Such artificial aging can occur through heat and/or radiation. One such heat aging method is Arrhenius Aging which artificially ages a cable through the application of elevated heat. Such elevated heat ages individual components in a manner similar to the deterioration expected to be seen in the components at a future point in time. In certain embodiments, a cable suitable for use in nuclear environments can maintain structural integrity and/or functional integrity after heat aging at about 180° C. for 24 hours and with exposure of about 100 MRad of radiation or more and, in certain embodiments, about 200 MRad or more. Such artificial aging can simulate a 60 year life span in accordance with IEEE 323 (2003) and IEEE 383 (2003) standards. As will be appreciated, such radiation can be one or more of gamma radiation or beta radiation.

Structural integrity can mean that cable remains physically intact and does not suffer from bursts, leaks, or other structural damage that could expose the surrounding environment to debris, or subject the interior of the cable to heat or radiation from the nuclear environment. Additionally, such cables can retain their flexibility. Functional integrity can mean that the cable continues to operate in the expected manner such as, for example, conducting the desired current or signals without attenuation.

As can be appreciated, a cable intended for use or operation in nuclear environments must also maintain structural and/or functional integrity during nuclear incidents, such as loss of cooling accident ("LOCA"). In accordance with IEEE 383 standards, a Design Basis Event test was formulated that simulates a nuclear reactor loss of coolant accident. The formulated Design Basis Event test requires that a cable be able to withstand one year of submersion in a hot boric acid solution while remaining structurally intact and electrically functional. IEEE 383 further requires both unaged cables and artificially aged cables pass the Design Basis Event. According to certain embodiments, an unaged cable suitable for use in nuclear environments can remain functionally operational and/or structurally intact after submersion in a boric acid solution having a temperature of about 125° F. to about 400° F. for about one year. Likewise, a cable artificially aged to a life span of about 60 years and exposed to about 350 MRad of radiation can maintain structural and functional integrity after submersion in boric acid heated to a temperature of about 125° F. to about 400° F. (about 50® C. to about 205® C.) for about one year. As will be appreciated, a cable artificially aged to such ages can also be aged to a shorter life span with lower amounts of radiation and maintain structural and functional integrity.

A cable in a nuclear environment can also be subject to a variety of other incidents that can pose a significant safety threat to the operation of the cable or nuclear environment such as, for example, a flame or fire. In certain embodiments, a cable intended for nuclear environments can be flame retardant and can pass the tray table vertical flame requirements enumerated in IEEE 1202 (1991) or NFPA 262 (2002). A cable can satisfy the standards of IEEE 1202 when a cable subjected to a burner mounted 20° from the horizontal with the burner facing up, chars only within 1.5 m of the burner.

As will be appreciated, a cable meeting all of the requirements of IEEE 323 can be considered a Class 1E cable and can be suitable for use in a nuclear reactor such as, for example, a Generation 3, a Generation 3+, or a Generation 4 reactor. Suitable examples of such reactors include, for example, Westinghouse Electric AP600 reactor, Westinghouse Electric AP1000 reactor, GE Advanced Boiling Water Reactor (ABWR), Mitsubishi Heavy Industries Advanced Pressurized Water Reactor (APWR), and the Advanced CANDU reactor (ACR-1000). Further details of nuclear reactors can be found in the following patents: U.S. Pat. Nos. 5,087,408; 5,096,659; and; U.S. Pre-Grant Publication No. 2007/0092053; and U.S. Pre-Grant Publication 2009/0323884, each incorporated by reference in their entirety. In certain embodiments, a nuclear reactor can be constructed that includes, in a radiation containment vessel, at least one cable suitable for use in a nuclear environment. In certain embodiments, a cable suitable for use in a nuclear environment can meet the requirements of a Class 1E cable. A cable in a nuclear reactor can conduct between about 5,000 volts and about 68,000 volts.

EXAMPLES

Figure 2:
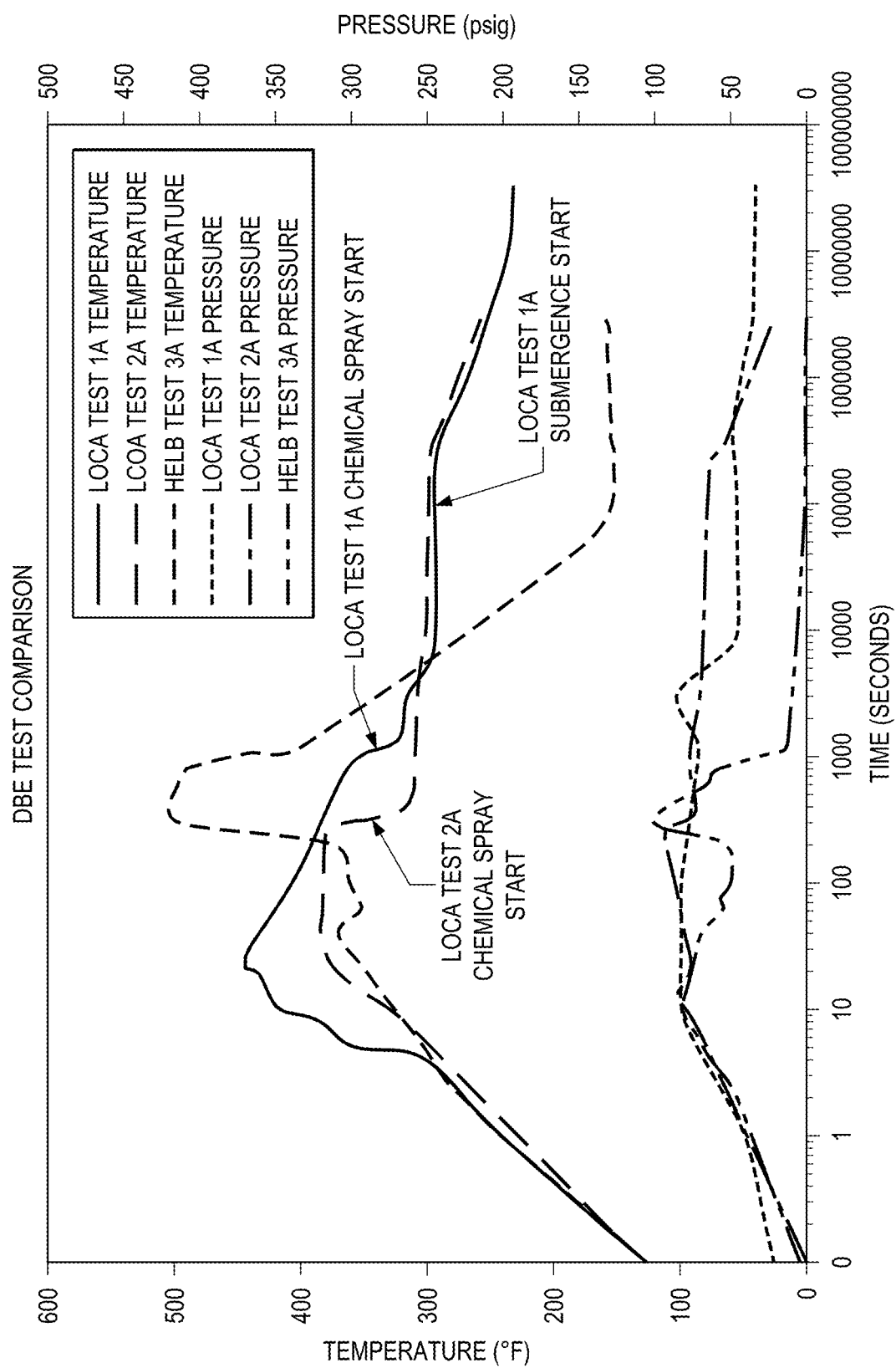
FIG. 2 is a graph illustrating the testing of cables undergoing a Design Basis Event test simulating a loss of coolant accident.

FIG. 2 depicts a graph illustrating the Design Basis Event ("DBE") test that simulates a loss of coolant accident. The graph depicts testing of 15 kV cables suitable for use in a nuclear environment that include a plurality of conductors, a conductor shield, an insulation layer, an insulation shield, a longitudinally applied corrugated shield, and a cross-linked polyolefin (XLPO) jacket layer. The cables were previously artificially aged to a life span of about 60 years and subject to 230 MRad of radiation or 350 MRad of radiation. As depicted in FIG. 2, the cables were subjected to high temperature, and pressure while submerged in a boric acid solution. After testing, the cables remained structurally and functionally operational.

Table 1 depicts various properties of polymers used in a cable jacket layer. Table 1 includes an Inventive Example using a cross-linked polyolefin layer suitable for a jacket layer of the present disclosure and a Comparative Example using a chlorosulfonated polyethylene ("CSPE") jacket used in prior medium-voltage nuclear cables. The chlorosulfonated polyethylene jacket is comparative in that it has a maximum life span of about 40 years and cracks after heat and radiation aging. The Inventive Example uses a jacket formed from a cross-linked polyolefin, in contrast, and demonstrates superior properties and remains structurally and functionally operational throughout the tests.

TABLE 1

| Property | Comparative Example | Inventive Example |
| --- | --- | --- |
| Initial | | |
| Initial Tensile Strength (psi min.)(ICEA T-27-581, 4.11.7) | 1800 | 2200 |
| Initial Elongation at Rupture (% min.)(ICEA T-27-581, 4.11.9) | 300 | 225 |
| After Air Aging at 100° C. for 7 Days | | |
| Retention of tensile strength (% min.) (ICEA T-27-581, 4.11.11.1) | 85 | >95 |
| Retention of elongation (% min.) (ICEA T-27-581, 4.11.11.1) | 65 | >95 |
| After Air Aging at 121° C. for 7 Days | | |
| Retention of tensile strength (% min.) (ICEA T-27-581, 4.11.11.1) | — | 93 |
| Retention of elongation (% min.) (ICEA T-27-581, 4.11.11.1) | — | 102 |
| After Oil Immersion at 121° C. for 18 Hours | | |
| Retention of tensile strength (% min.) (ICEA T-27-581, 4.11.11.4) | 60 | 72 |
| Retention of elongation (% min.) (ICEA T-27-581, 4.11.11.4) | 60 | 95 |
| Hot Creep Test at 150° C. (% max) (ICEA S-95-658, 6.6.3) | 100 | 50 |

TABLE 1-continued

| Property | Comparative Example | Inventive Example |
|---|---|---|
| Sunlight Resistance | | |
| Retention of tensile strength (% min.) (ICEA S-95-658, 6.6.3) | 80 | 92 |
| Retention of elongation (% min.) (ICEA S-95-658, 6.6.3) | 80 | 90 |
| Cold Blend (° C.) (ICEA T-27-581, 4.2) | −25 | −40 |
| IEEE 1202 Vertical Tray Flame Test | Pass | Pass |

Figure 3:
FIG. 3 depicts an image of cables subsequent to a Design Basis Event test simulating a loss of coolant accident.

FIG. 3 depicts an image of the 15 kV cables evaluated in FIG. 2 and visually demonstrates the structural stability of the cables following DBE testing. The cable depicted in FIG. 3 includes a copper longitudinally applied corrugated shield and an XLPO jacket layer. As evidenced by FIG. 3, the evaluated cable retained structural integrity because it does not exhibit any visible cracks in either the longitudinally applied corrugated shield or the jacket layer. The cable also maintained functionality in accordance to IEEE 383.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of ordinary skill in the art. Rather it is hereby intended the scope be defined by the claims appended various embodiments. The scope is, of course, not limited to the examples or embodiments set forth herein, but can be employed in any number of applications and equivalent articles by those of hereto.

What is claimed is:

1. A cable for nuclear environments comprising:
   one or more conductors;
   a longitudinally applied corrugated shield surrounding the one or more conductors; and
   a cross-linked polyolefin jacket layer surrounding the longitudinally applied corrugated shield; and
   wherein the cable conducts about 5,000 volts to about 68,000 volts in use, is radiation resistant and heat resistant, and comprises a life span of about 60 years or more when measured in accordance with IEEE 323.

2. The cable of claim 1 conducts about 15,000 volts in use.

3. The cable of claim 1, wherein the conductor substantially continuously operates at a temperature of about 90° C. or more over the about 60 years or more.

4. The cable of claim 1 passes the requirements of IEEE 383 after a Design Basis Event simulating a loss of coolant accident.

5. The cable of claim 4, wherein the Design Basis Event comprises submersion in a boric acid solution for about 1 year, wherein the boric acid is maintained at about 50° C. to about 205° C.

6. The cable of claim 4 is exposed to about 100 MRad or more of radiation to simulate a reactor life of about 60 years prior to the Design Basis Event.

7. The cable of claim 6, wherein the about 100 MRad or more of radiation comprises one or more of gamma radiation and beta radiation.

8. The cable of claim 1, wherein the cross-linked polyolefin jacket comprises one or more ethylene-containing polymers comprising polyethylene and ethylene vinyl acetate.

9. The cable of claim 1 passes the IEEE 1202 vertical tray flame test.

10. The cable of claim 1, wherein the longitudinally applied corrugated shield is formed from a metal material comprising copper or copper alloy.

11. The cable of claim 1, wherein the longitudinally applied corrugated shield comprises an overlap of about 0.25 inches or more.

12. The cable of claim 1, wherein the longitudinally applied corrugated shield further comprises an outer layer comprising tin.

13. The cable of claim 1 further comprises an insulation layer surrounding the one or more conductors, and wherein the insulation layer comprises ethylene propylene rubber.

14. The cable of claim 13 further comprises a conductor shield surrounding the one or more conductors and an insulation shield surrounding the insulation layer.

15. The cable of claim 1, wherein the longitudinally applied corrugated shield is substantially free of cracks after artificial aging at about 180° C. for about 24 hours.

16. The cable of claim 1, wherein the jacket layer is radiation cured.

17. A nuclear reactor comprising one or more cables of claim 1.

18. A cable for nuclear environments, the cable comprising:
   one or more conductors;
   an insulation layer surrounding the one or more conductors, wherein the insulation layer is formed from ethylene propylene rubber ("EPR");
   a longitudinally applied corrugated shield surrounding the insulation layer; and
   a cross-linked polyolefin jacket layer surrounding the longitudinally applied corrugated shield; and
   wherein the cable conducts about 5,000 volts to about 68,000 volts in use and is substantially free of cracks after artificially aging the cable with heat and about 100 MRads of radiation to an age of about 60 years or more.

19. A cable for nuclear environments, the cable comprising:
- one or more conductors;
- a longitudinally applied corrugated shield surrounding the one or more conductors; and
- a cross-linked polyolefin jacket layer surrounding the longitudinally applied corrugated shield; and
- wherein the cable conducts about 5,000 volts to about 68,000 volts in use, maintains structural and functional integrity after artificially aging the cable at about 180° C. for about 24 hours and about 100 MRad of radiation, and comprises a life span of about 60 years or more when measured in accordance with IEEE 323.

* * * * *